(12) United States Patent
Park et al.

(10) Patent No.: US 11,473,905 B2
(45) Date of Patent: Oct. 18, 2022

(54) APPARATUS AND METHOD OF SHOOTING SCATTERED BLOOD MARKS AT RIGHT ANGLES

(71) Applicant: REPUBLIC OF KOREA (NATIONAL FORENSIC SERVICE DIRECTOR MINISTRY OF THE INTERIOR AND SAFETY), Wonju-si (KR)

(72) Inventors: Nam Kyu Park, Bucheon-si (KR); Jae Mo Goh, Wonju-si (KR); Jin Pyo Kim, Daejeon (KR); Young Il Seo, Wonju-si (KR); Eun Ah Joo, Yongin-si (KR); Je Hyun Lee, Wonju-si (KR); Sang Yoon Lee, Wonju-si (KR); Kyung Mi Kim, Namyangju-si (KR)

(73) Assignee: REPUBLIC OF KOREA (NATIONAL FORENSIC SERVICE DIRECTOR MINISTRY OF THE INTERIOR AND SAFETY), Wonju-si (KR)

( * ) Notice: Subject to any disclaimer, the term of this patent is extended or adjusted under 35 U.S.C. 154(b) by 0 days.

(21) Appl. No.: 17/098,941

(22) Filed: Nov. 16, 2020

(65) Prior Publication Data

US 2022/0042791 A1 Feb. 10, 2022

(30) Foreign Application Priority Data

Aug. 4, 2020 (KR) .................. 10-2020-0097465

(51) Int. Cl.
*G02C 7/08* (2006.01)
*G01B 11/26* (2006.01)

(52) U.S. Cl.
CPC .............. *G01B 11/26* (2013.01); *G02C 7/086* (2013.01)

(58) Field of Classification Search
CPC ....................................................... G02C 7/08
See application file for complete search history.

(56) References Cited

U.S. PATENT DOCUMENTS 9,470,908 B1 * 10/2016 Frankel ................. G02C 5/124
2019/0235200 A1 * 8/2019 Ishimoda ............. G02B 15/144

FOREIGN PATENT DOCUMENTS

| CN | 105891218 A | * | 8/2016 | |
|---|---|---|---|---|
| JP | H0772396 A | * | 12/1993 | |
| JP | 2006345119 A | * | 12/2006 | |
| KR | 10-2011-0019165 A | | 2/2011 | |
| KR | 10-1588322 B1 | | 2/2016 | |
| WO | WO-2010052173 A2 | * | 5/2010 | ............. H04N 1/195 |

OTHER PUBLICATIONS

Korean Office Action dated Oct. 11, 2021, in connection with the Korean Patent Application No. 10-2020-0097465.

* cited by examiner

*Primary Examiner* — Shadan E Haghani
(74) *Attorney, Agent, or Firm* — Hauptman Ham, LLP

(57) ABSTRACT

An apparatus for shooting scattered blood marks at right angles includes: a first body including a lens coupling portion formed to couple a camera lens and a housing portion having a hollow inside and forming an opening at one end thereof; and a second body including a surface contact portion formed to contact a target surface including scattered blood marks and an insertion portion extending from the surface contact portion and inserted into the housing portion to adjust a distance between the scattered blood marks and the camera lens.

7 Claims, 5 Drawing Sheets

APPARATUS AND METHOD OF SHOOTING SCATTERED BLOOD MARKS AT RIGHT ANGLES

CROSS-REFERENCE TO RELATED APPLICATION

This application claims the benefit of Korean Patent Application No. 10-2020-0097465, filed on Aug. 4, 2020, in the Korean Intellectual Property Office, the disclosure of which is incorporated herein in its entirety by reference.

BACKGROUND

1. Field

One or more embodiments relate to an apparatus and method of shooting scattered blood marks at right angles.

2. Description of the Related Art

In bloodshed events, blood morphology analysis plays an important role in reconstructing the site. Because scattered blood marks tell the perpetrator's actions at the time of the hit, it is important to shoot scattered blood marks as morphological evidence in order to analyze the morphology of scattered blood marks.

When a bloodshed event occurs, scattered blood marks caused by the perpetrator's hit are often formed on the wall. Because these scattered blood marks are shot and a bleeding site at the time of the hit is estimated by analyzing the direction of a major axis and the ratio of the major axis and a minor axis, it is important to accurately shoot the scattered blood marks at right angles.

Apparatuses such as tripods and mini tripods are used to shoot scattered blood marks on the wall at right angles, but there are many inconveniences to shoot scattered blood marks generated by spreading in various directions. Because of these inconveniences, there are many cases where shooting is performed without using these apparatuses, resulting in an error during the blood morphology analysis.

Therefore, there is a need for an apparatus capable of easily and conveniently shooting scattered blood marks on the wall at right angles.

[Prior art document] Korean Patent No. 10-1588322 (registered on Jan. 19, 2016)

SUMMARY

One or more embodiments include an apparatus and a method of shooting scattered blood marks at right angles, capable of accurately shooting scattered blood marks on a target surface at right angles without using a separate device such as a tripod.

According to one or more embodiments, an apparatus for shooting scattered blood marks at right angles includes: a first body including a lens coupling portion formed to couple a camera lens and a housing portion having a hollow inside and forming an opening at one end thereof; and a second body including a surface contact portion formed to contact a target surface including scattered blood marks and an insertion portion extending from the surface contact portion and inserted into the housing portion to adjust a distance between the scattered blood marks and the camera lens.

In this case, the first body may further include an LED lighting portion located in close contact with the lens coupling portion and including at least one LED light source capable of irradiating light to the scattered blood marks.

In this case, the first body may further include an on/off switch located outside the housing portion and configured to turn on/off the LED lighting portion by a user's input.

In this case, the second body may further include a transparent plate located in close contact with the surface contact portion and displaying a measurer measuring the size of the scattered blood marks.

In this case, the second body may include a transparent material such that light may be transmitted.

In this case, the first body and the second body may each be formed in a cylindrical shape.

A method of shooting scattered blood marks at right angles according to an embodiment may include coupling a lens coupling portion of an apparatus for shooting scattered blood marks at right angles to a camera lens, contacting a surface contact portion of the apparatus with a target surface including scattered blood, adjusting a distance between the scattered blood marks and the camera lens by inserting an insertion portion of a second body of the apparatus into a housing portion of a first body of the apparatus, adjusting the focus of the camera lens and controlling on/off of an LED lighting portion, and shooting the scattered blood marks with a camera.

In this case, the method may further include measuring the size of the scattered blood marks with a measurer displayed on a transparent plate.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
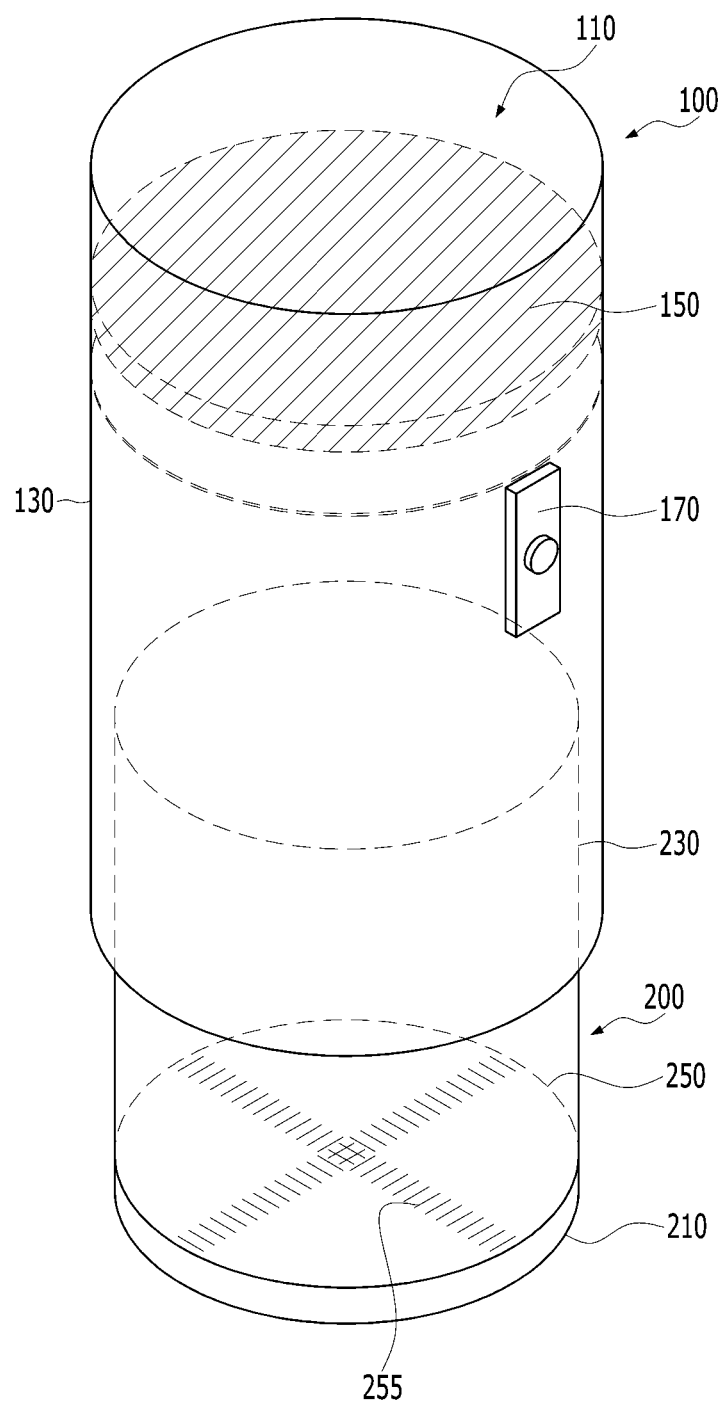
FIG. 1 is a perspective view of an apparatus for shooting scattered blood marks at right angles, according to an embodiment.

Since the disclosure may have diverse modified embodiments, preferred embodiments are illustrated in the drawings and are described in the detailed description. An effect and a characteristic of the disclosure, and a method of accomplishing these will be apparent when referring to embodiments described with reference to the drawings. The disclosure may, however, be embodied in many different forms and should not be construed as limited to the embodiments set forth herein.

Hereinafter, embodiments will be described in detail with reference to the accompanying drawings. The same reference numerals are used to denote the same elements, and repeated descriptions thereof will be omitted.

It will be understood that although the terms "first," "second," etc. may be used herein to describe various components, these components should not be limited by these terms.

An expression used in the singular encompasses the expression of the plural, unless it has a clearly different meaning in the context.

It will be further understood that the terms "comprises" and/or "comprising" used herein specify the presence of stated features or elements, but do not preclude the presence or addition of one or more other features or elements.

It will be understood that when a layer, region, or element is referred to as being "formed on" another layer, area, or element, it can be directly or indirectly formed on the other layer, region, or element. That is, for example, intervening layers, regions, or elements may be present.

Sizes of elements in the drawings may be exaggerated for convenience of explanation. In other words, since sizes and thicknesses of components in the drawings are arbitrarily illustrated for convenience of description, the following embodiments are not limited thereto.

When a certain embodiment may be implemented differently, a specific process order may be performed differently from the described order. For example, two consecutively described processes may be performed substantially at the same time or performed in an order opposite to the described order.

It will be understood that when a layer, region, or component is connected to another portion, the layer, region, or component may be directly connected to the portion or an intervening layer, region, or component may exist. For example, when a layer, region, or component is electrically connected to another portion, the layer, region, or component may be directly electrically connected to the portion or may be indirectly connected to the portion through another layer, region, or component.

Hereinafter, an apparatus for shooting scattered blood marks at right angles according to an embodiment will be described with reference to FIGS. 1 to 3.

Figure 2:
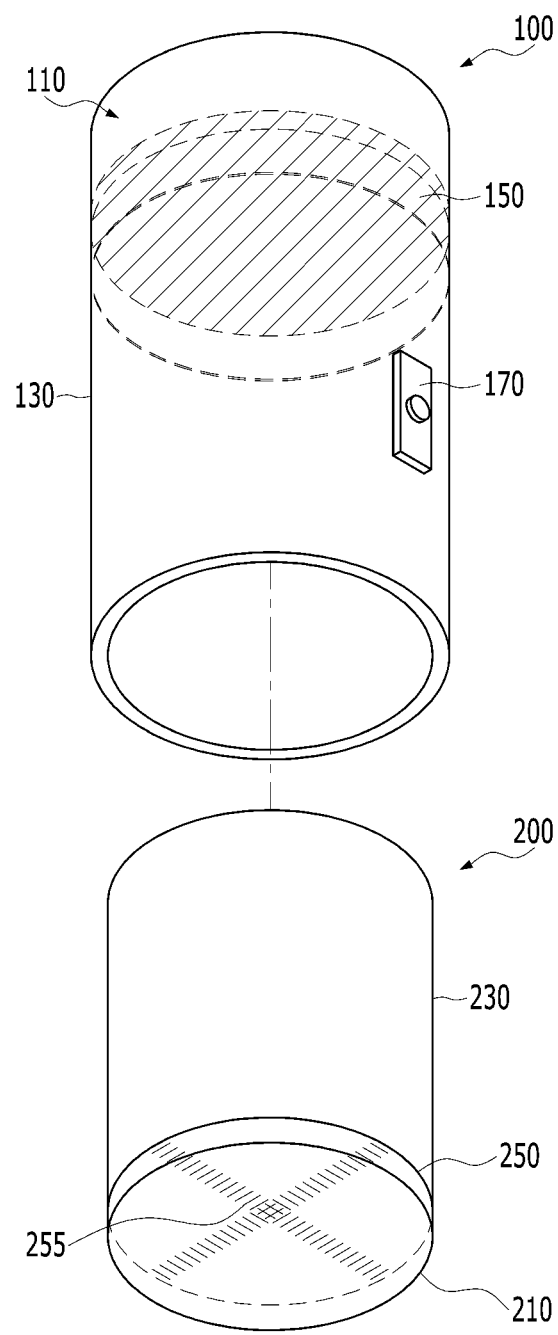
FIG. 2 is an exploded perspective view of an apparatus for shooting scattered blood marks at right angles, according to an embodiment.
Figure 3:
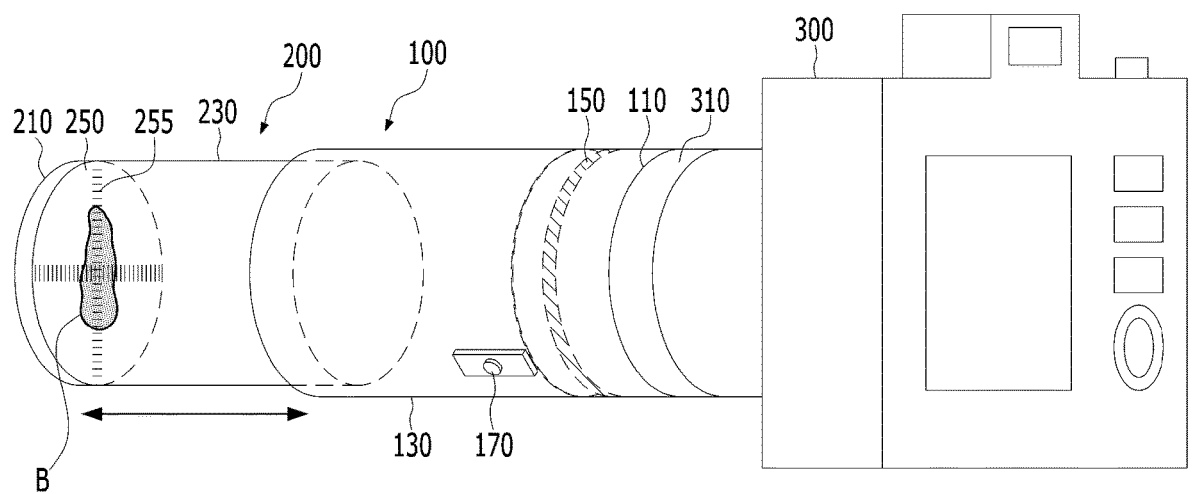
FIG. 3 is a view showing a state of use of an apparatus for shooting scattered blood marks at right angles, according to an embodiment.

FIG. 1 is a perspective view of an apparatus for shooting scattered blood marks at right angles, according to an embodiment, and FIG. 2 is an exploded perspective view of an apparatus for shooting scattered blood marks at right angles, according to an embodiment. FIG. 3 is a view showing a state of use of an apparatus for shooting scattered blood marks at right angles, according to an embodiment.

The apparatus for shooting scattered blood marks at right angles may include a first body 100 and a second body 200.

The first body 100 may include a lens coupling portion 110 and a housing portion 130, and may further include an LED lighting portion 150 and an on/off switch 170.

The lens coupling portion 110 may be formed to couple a camera lens 310 to one end of the first body 100. A camera 300 for shooting scattered blood marks B is not limited in its type as long as the camera 300 may record an image of the scattered blood marks B by shooting the scattered blood marks B using light. A film camera that generates photos by sensitizing a film may be used, but a digital camera using an image sensor is generally used. For example, a digital single lens reflex (DSLR) camera may be used to shoot the scattered blood marks B.

The housing portion 130 may have a hollow formed therein, and an opening may be formed at one end thereof. An insertion portion 230 of the second body 200 to be described later may be inserted into the housing portion 130. Accordingly, the housing portion 130 may be formed with a hollow that may accommodate the insertion portion 230 inserted therein.

The LED lighting portion 150 is located in close contact with the lens coupling portion 110, and may irradiate light to the scattered blood marks B. In addition, the LED lighting portion 150 may include one or more LED light sources. The LED lighting portion 150 may be used to reinforce light when the amount of light is insufficient during close-up shooting of the scattered blood marks B. In order to supply power to the LED light source of the LED lighting portion 150, a space capable of accommodating a battery or the like may be formed inside the first body 100.

The on/off switch 170 is located outside the housing portion 130 of the first body 100 and may be turned on/off by a user's input. The on/off switch 170 is electrically connected to the LED lighting portion 150, and thus light emitted from the LED light source may be adjusted according to a user's input.

The second body 200 may include the surface contact portion 210 and the insertion portion 230.

In this case, the second body 200 may include a transparent material such that light may be transmitted. For example, the second body 200 may include an acrylic transparent material to efficiently transmit natural light or light irradiated from the LED lighting portion 150. Meanwhile, the first body 100 may also include a transparent material to transmit light.

The surface contact portion 210 may be formed at one end of the second body 200 and may be formed to be in contact with a target surface including the scattered blood marks B. At this time, the surface contact portion 210 is formed perpendicular to a virtual major axis penetrating the apparatus for shooting scattered blood marks at right angles according to an embodiment.

The insertion portion 230 may be formed at the other end of the second body 200. The insertion portion 230 extends from the surface contact portion 210 and is inserted into the housing portion 130 so that the distance between the scattered blood marks B and the camera lens 310 may be adjusted. The apparatus for shooting scattered blood marks at right angles according to an embodiment may adjust the distance from the target surface according to the degree of insertion of the insertion portion 230. According to an embodiment, the scattered blood marks B may be more accurately shot by continuously adjusting the distance from the target surface according to the adjustment principle of a zoom lens according to the degree of insertion of the insertion portion 230.

A transparent plate 250 is located in close contact with the surface contact portion 210, and a measurer 255 measuring the size of the scattered blood marks B may be displayed. The transparent plate 250 may be located at a distance of several mm from the surface contact portion 210 in contact with the target surface. The measurer 255 displayed on the transparent plate 250 is displayed transparently, and thus the size of the scattered blood marks B may be measured without disturbing a user from observing the shape of the scattered blood marks B. In the case of shooting the scattered blood marks B, the size of the scattered blood marks B is generally measured by attaching a sticker measurer to the target surface. However, in the case of using the apparatus for shooting scattered blood marks at right angles according to an embodiment, a separate sticker measurer is not required.

Figure 4:
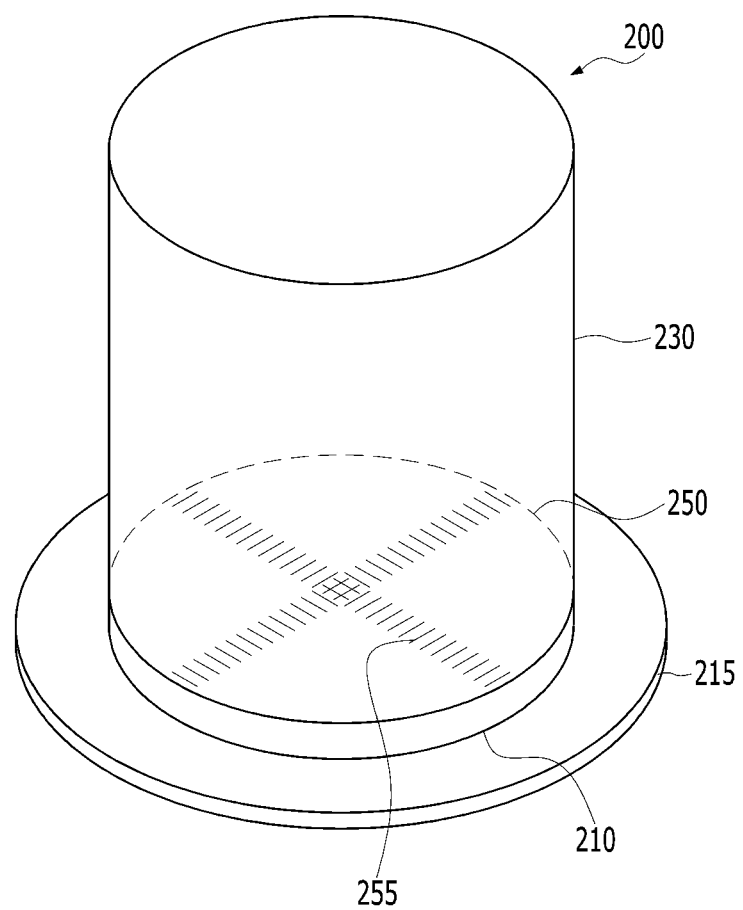
FIG. 4 is a schematic view of a second body of an apparatus for shooting scattered blood marks at right angles, according to another embodiment.

FIG. 4 is a schematic view of a second body of an apparatus for shooting scattered blood marks at right angles, according to another embodiment.

Referring to FIG. 4, another embodiment may further include an attached portion 215.

The attachment portion 215 may be formed in a flange shape surrounding the surface contact portion 210 of the second body 200. The attachment portion 215 includes an elastic material so as to be attached to a target surface, and thus the apparatus for shooting scattered blood marks at right angles may be firmly attached to the target surface without shaking.

On the other hand, the first body 100 and the second body 200 are formed in a shape in which the insertion portion 230 of the second body 200 is inserted into the housing portion 130 of the first body 100 and the degree of insertion of the insertion portion 230 of the second body 200 may be adjusted, but are not limited to a specific shape.

For example, each of the first body 100 and the second body 200 may be formed in a cylindrical shape.

At this time, the lens coupling portion 110 of the first body 100 is formed at one end of the first body 100 and is formed in a circular shape to fit the shape of the camera lens 310 so that the camera lens 310 may be coupled to the lens coupling portion 110 of the first body 100. For example, a thread is formed inside the housing portion 130 of the first body 100, and a thread is formed outside the insertion portion 230 of the second body 200. As the threads are engaged with each other and rotated, the insertion portion 230 of the second body 200 may be inserted into the housing portion 130 of the first body 100. In this way, when the first body 100 and the second body 200 are each formed in a cylindrical shape, as the insertion portion 230 of the second body 200 rotates and is inserted into the housing portion 130 of the first body 100, the degree of insertion of the insertion portion 230 is adjusted according to the angle of rotation. Accordingly, the distance between the scattered blood marks B and the camera lens 310 may be adjusted.

Figure 5:
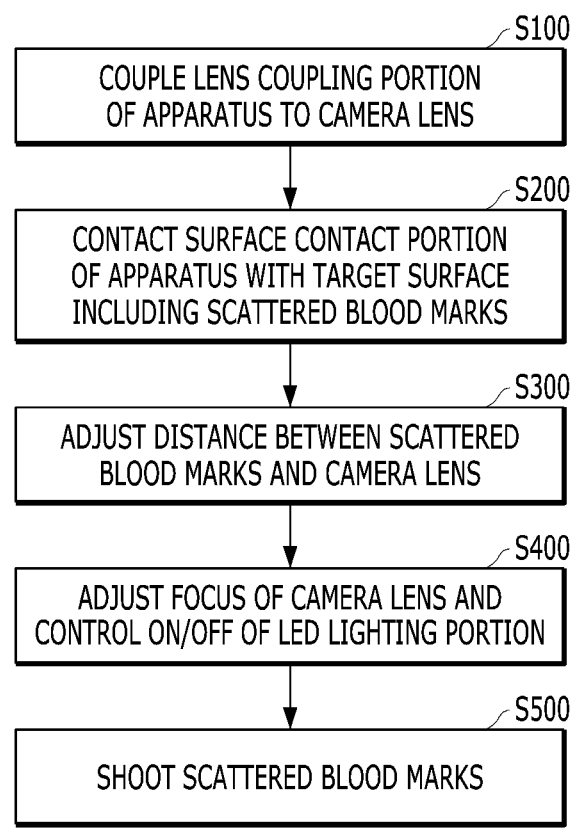
FIG. 5 is a flowchart illustrating a method of shooting scattered blood marks at right angles, according to an embodiment.

Hereinafter, a method of shooting a scattered blood marks at right angles according to an embodiment will be described with reference to FIG. 5. FIG. 5 is a flowchart illustrating a method of shooting scattered blood marks at right angles, according to an embodiment.

In operation S100, the lens coupling portion 110 of the apparatus for shooting scattered blood marks at right angles according to an embodiment is coupled to the camera lens 310. Here, the lens coupling portion 110 is formed to fit the shape of the camera lens 310, and thus the camera lens 310 may be fixed.

In operation S200, the surface contact portion 210 of the apparatus for shooting the scattered blood marks at right angles is in contact with a target surface including the scattered blood marks B. The target surface including the scattered blood marks B may be selected such that the scattered blood marks B may be shot by the camera lens 310, and the surface contact portion 210 of the apparatus for shooting the scattered blood marks at right angles may contact the target surface. In this case, the target surface may be located on a wall surface positioned perpendicular to a ground or on a bottom surface positioned parallel to the ground.

In operation S300, the insertion portion 230 of the second body 200 of the apparatus for shooting scattered blood marks at right angles according to an embodiment is inserted into the housing portion 130 of the first body 100 to adjust a distance between the scattered blood marks B and the camera lens 310. Here, by adjusting the degree to which the insertion portion 230 of the second body 200 is inserted into the housing portion 130 of the first body 100, a distance between the scattered blood marks B and the camera lens 310 may be adjusted.

In operation S400, the focus of the camera lens 310 is adjusted and the on/off of the LED lighting portion 150 is controlled. In this way, the scattered blood marks B may be clearly shot by adjusting the focus of the camera lens 310, and light is irradiated on the scattered blood marks B by adjusting the LED lighting portion 150 to "on", and thus the scattered blood marks B may be clearly shot.

In this case, operations S300 and S400 may be sequentially performed, and may be performed in reverse order.

In operation S500, the scattered blood marks B are shot with the camera 300.

In addition, in operation S600, the size of the scattered blood marks B is measured with the measurer 255 displayed on the transparent plate 250. At this time, the exact direction of a major axis of the scattered blood marks B, the lengths of the major axis and a minor axis, etc. may be measured through the measurer 255.

In this case, operations S500 and S600 may be sequentially performed, and may be performed in reverse order.

In this way, the scattered blood marks B on the wall or the bottom surface are shot at right angles with the apparatus for shooting the scattered blood marks at right angles, and thus the size of the scattered blood marks B may be accurately measured.

As described above, according to the apparatus and method of shooting scattered blood marks at right angles according to embodiments, the scattered blood marks B on a target surface may be shot at right angles without a separate device, so the shape and size of the scattered blood marks B may be conveniently and accurately identified. In addition, according to embodiments, it is possible to measure the size of the scattered blood marks B using the measurer 255 displayed on the transparent plate 250 without using a separate sticker, thus providing convenience to users. Therefore, according to embodiments, it is possible to more accurately calculate a bleeding site at the time a perpetrator hits by accurately analyzing the direction of a major axis and the ratio of the major axis and a minor axis of each of the scattered blood marks B, and thus effectively contribute to solving a bleeding case.

According to an embodiment, it is possible to accurately grasp the shape and size of scattered blood marks by accurately shooting the scattered blood marks on a target surface at right angles without a separate device. In addition, according to an embodiment, the size of the scattered blood marks may be measured using a measurer displayed on a transparent plate without using a separate sticker measurer.

The description herein is for the purpose of describing the disclosure and numerous modifications and adaptations will be readily apparent to one of ordinary skill in the art without departing from the spirit and scope of the disclosure.

In this regard, the present embodiments may have different forms and should not be construed as being limited to the descriptions set forth herein. While the disclosure has been particularly shown and described with reference to embodiments thereof, it will be understood that various changes in form and details may be made therein without departing from the spirit and scope of the following claims.

What is claimed is:

1. An apparatus for shooting scattered blood marks at right angles, the apparatus comprising:
a first body including a lens coupling portion formed to couple a camera lens at a first end of the first body and a housing portion having a hollow inside and forming an opening at a second end of the first body;

a second body including a surface contact portion formed to contact a target surface including scattered blood marks and an insertion portion extending from the surface contact portion and inserted into the housing portion to adjust a distance between the scattered blood marks and the camera lens; and an LED lighting portion adjacent to the lens coupling portion, wherein the lighting portion comprises at least one LED light source capable of irradiating light to the scattered blood marks, wherein the second body comprise an attachment portion formed in a flange shape surrounding the surface contact portion so that the attachment portion is configured to be attached to the target surface.

2. The apparatus of claim 1, wherein the first body further comprises:

an on/off switch located outside the housing portion and configured to turn on/off the LED lighting portion by a user's input.

3. The apparatus of claim 1, wherein the second body further comprises:

a transparent plate located in close contact with the surface contact portion and displaying a measurer measuring the size of the scattered blood marks.

4. The apparatus of claim 1, wherein the second body includes a transparent material such that light may be transmitted.

5. The apparatus of claim 1, wherein the first body and the second body each are formed in a cylindrical shape.

6. A method of shooting scattered blood marks at right angles, the method comprising:

coupling a lens coupling portion of an apparatus for shooting scattered blood marks at right angles to a camera lens, the apparatus including a first body including a lens coupling portion, a housing portion, an LED lighting portion, and an on/off switch and a second body including a surface contact portion, an insertion portion, and a transparent plate displaying a measurer, wherein the LED lighting portion is adjacent to the lens coupling portion and wherein an attachment portion formed in a flange shape surrounding the surface contact portion so that the attachment portion is configured to be attached to the target surface;

contacting the surface contact portion of the apparatus with a target surface including scattered blood;

adjusting a distance between the scattered blood marks and the camera lens by inserting the insertion portion of the second body of the apparatus into the housing portion of the first body of the apparatus;

adjusting a focus of the camera lens and controlling on/off of the LED lighting portion; and shooting the scattered blood marks with the camera.

7. The method of claim 6, further comprising:

measuring the size of the scattered blood marks with the measurer displayed on the transparent plate.

* * * * *